United States Patent
Baxter et al.

(10) Patent No.: US 10,458,704 B2
(45) Date of Patent: Oct. 29, 2019

(54) SEPARATION OF COMPONENTS FROM A FLUID BY SOLIDS PRODUCTION

(71) Applicants: Larry Baxter, Orem, UT (US); Eric Mansfield, Spanich Fork, UT (US); Christopher Hoeger, Provo, UT (US); Kyler Stitt, Lindon, UT (US); Skyler Chamberlain, Provo, UT (US); Nathan Davis, Bountiful, UT (US)

(72) Inventors: Larry Baxter, Orem, UT (US); Eric Mansfield, Spanich Fork, UT (US); Christopher Hoeger, Provo, UT (US); Kyler Stitt, Lindon, UT (US); Skyler Chamberlain, Provo, UT (US); Nathan Davis, Bountiful, UT (US)

(73) Assignee: Hall Labs LLC, Provo, UT (US)

(*) Notice: Subject to any disclaimer, the term of this patent is extended or adjusted under 35 U.S.C. 154(b) by 168 days.

(21) Appl. No.: 15/692,506

(22) Filed: Aug. 31, 2017

(65) Prior Publication Data

US 2019/0063832 A1  Feb. 28, 2019

(51) Int. Cl.
*F25J 3/08* (2006.01)
*B01D 7/02* (2006.01)
(Continued)

(52) U.S. Cl.
CPC .............. *F25J 3/08* (2013.01); *B01D 5/0042* (2013.01); *B01D 7/02* (2013.01); *B01D 53/002* (2013.01); *B01D 46/0053* (2013.01); *B01D 46/0076* (2013.01); *B01D 2257/304* (2013.01); *B01D 2257/404* (2013.01); *B01D 2257/504* (2013.01); *B01D 2258/0283* (2013.01); *F25J 2205/20* (2013.01); *F25J 2205/24* (2013.01); *F25J 2205/40* (2013.01); *F25J 2205/84* (2013.01)

(58) Field of Classification Search
CPC ........ F25J 2205/20; F25J 2205/24; F25J 3/08; F25J 2205/40; F25J 2205/84; B01D 46/0053; B01D 46/00675; B01D 46/0076
See application file for complete search history.

(56) References Cited

U.S. PATENT DOCUMENTS 3,501,002 A * 3/1970 Talley, Jr. .............. B07B 1/18
  209/240
4,238,930 A * 12/1980 Hogan .................. F25C 1/12
  62/138

(Continued)

*Primary Examiner* — Frantz F Jules
*Assistant Examiner* — Lionel Nouketcha (57) ABSTRACT

A method for separating components from a fluid is disclosed. A cooling element is provided and is disposed in contact with a distal side of one or more thermally-conductive surfaces. One or more resistive heating elements are provided and are disposed in contact with or embedded in a proximal side of the one or more thermally-conductive surfaces. A fluid comprising one or more secondary components is provided. The fluid is passed across the one or more thermally conductive surfaces, the one or more secondary components freezing, crystallizing, desublimating, depositing, condensing, or combinations thereof, out of the fluid. The one or more resistive heating elements engage such that the one or more solid secondary components detach and pass out the solids outlet. The one or more resistive heating elements disengage, restarting production of the one or more solid secondary components.

20 Claims, 11 Drawing Sheets (51) Int. Cl.
*B01D 53/00* (2006.01)
*B01D 5/00* (2006.01)
*B01D 46/00* (2006.01)

(56) References Cited

U.S. PATENT DOCUMENTS

| | | | | |
|---|---|---|---|---|
| 4,922,723 | A * | 5/1990 | Broadbent | F25C 1/125 |
| | | | | 62/353 |
| 5,212,957 | A * | 5/1993 | Ruff | C02F 1/22 |
| | | | | 62/124 |
| 8,950,197 | B2 * | 2/2015 | Bortoletto | F25C 1/20 |
| | | | | 62/348 |
| 2005/0072186 | A1 * | 4/2005 | Amin | B01D 21/2455 |
| | | | | 62/601 |
| 2011/0296866 | A1 * | 12/2011 | Jallais | B01D 53/002 |
| | | | | 62/603 |
| 2012/0297821 | A1 * | 11/2012 | Baxter | B01D 53/343 |
| | | | | 62/617 |

* cited by examiner

SEPARATION OF COMPONENTS FROM A FLUID BY SOLIDS PRODUCTION

This invention was made with government support under DE-FE0028697 awarded by The Department of Energy. The government has certain rights in the invention.

FIELD OF THE INVENTION

This invention relates generally to removal of solutes from fluids. More particularly, we are interested in removing contaminants like acid gases, such as carbon dioxide, from cryogenic fluids or flue gases.

BACKGROUND

The ability to separate contaminants from a liquid or gas is of critical importance in nearly every industry. In many instances, these contaminants condense, freeze, or deposit out of the liquid or gas. While changing the process from a liquid-liquid or gas-vapor separation to a solid-liquid or solid-gas separation is beneficial in many cases, the solids formed in this manner often become difficult to remove without shutting down the process and melting, desublimating, or scraping the solids. A method for separating contaminants from a liquid or gas by producing solids that mitigates or eliminates these difficulties is needed. Liquids are intended to include slurries, in this instance.

United States patent publication number 9587872, to Boarman, et al., teaches a refrigerator with thermoelectric device control process for an icemaker. The device utilizes a thermoelectric device to cool the ice and to harvest the ice. The present disclosure differs from this disclosure in that the device freezes the entire liquid stream, does not separate components in the liquid from the primary component of the liquid, and uses a single thermoelectric device for both making ice and removing ice. This disclosure is pertinent and may benefit from the methods disclosed herein and is hereby incorporated for reference in its entirety for all that it teaches.

U.S. Pat. No. 5,297,394, to Frohbieter, et al., teaches a clear cube ice maker. The present disclosure differs from this disclosure in that the device freezes the entire liquid stream, does not separate components in the liquid from the primary component of the liquid, and uses the cooling device for making ice and as the heating device for removing ice. This disclosure is pertinent and may benefit from the methods disclosed herein and is hereby incorporated for reference in its entirety for all that it teaches.

SUMMARY

A method for separating components from a fluid is disclosed. A cooling element, one or more resistive heating elements, a fluid inlet, one or more thermally-conductive surfaces, a fluid outlet, and a solids outlet are provided. The cooling element is provided to cool the one or more thermally-conductive surfaces and is disposed in contact with a distal side of the one or more thermally-conductive surfaces. The one or more resistive heating elements are provided and are disposed in contact with or embedded in a proximal side of the one or more thermally-conductive surfaces. A fluid comprising one or more secondary components is provided. The secondary components are dissolved, entrained, suspended, absorbed, condensed, or combinations thereof in the fluid. The fluid freezes at a lower temperature than the one or more secondary components. The fluid is passed across the one or more thermally conductive surfaces, at least a portion of the secondary components freezing, crystalizing, desublimating, depositing, condensing, or combinations thereof, out of the fluid as one or more solid secondary components, while the primary component passes out the fluid outlet. The one or more resistive heating elements engage as the one or more solid secondary components reach a pre-determined thickness such that the one or more solid secondary components detach from the one or more thermally-conductive surfaces and pass out the solids outlet. The one or more resistive heating elements disengage, restarting production of the solid secondary component.

The fluid may comprise a gas, a liquid, a slurry, or combinations thereof.

The method may further comprise detecting that the one or more solid secondary components reach a pre-determined thickness before engaging the one or more resistive heating elements. An instrument may be provided that measures thicknesses of the one or more solid secondary components on the one or more thermally-conductive surfaces. The instrument may comprise one or more pistons that probe the one or more thermally-conductive surfaces, determining the thicknesses by how close the one or more pistons come to the one or more thermally-conductive surfaces without resistance. The instrument may provide a signal to a controller.

The one or more resistive heating elements may be engaged at a set interval.

The one or more thermally conductive surfaces may comprise slanted shelves attached to a vertical support. One or more of the resistive heating elements may be provided adjacent to the vertical support and a top portion of the one or more shelves.

The one or more thermally conductive surfaces may comprise a cylindrical surface of a cylindrical cooling heat exchanger. The cylindrical surface may be overlaid with the one or more resistive heating elements, the one or more resistive heating elements comprising a fine, wire mesh heated by electricity. The one or more resistive heating elements may comprise a ring of a conductive material, the ring embedded in an end of a piston which descends when the heating element is engaged, warming the one or more solid secondary components and slicing the one or more solid secondary components off the cylindrical surface, and returns to a top portion when the heating element is disengaged.

The fluid may comprise water, hydrocarbons, liquid ammonia, liquid carbon dioxide, cryogenic liquids, flue gas, syngas, producer gas, natural gas, steam reforming gas, hydrocarbons, light gases, refinery off-gases, organic solvents, steam, ammonia, or combinations thereof. The hydrocarbons may comprise 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

The one or more secondary components may comprise carbon dioxide, nitrogen oxide, sulfur dioxide, nitrogen dioxide, sulfur trioxide, hydrogen sulfide, hydrogen cyanide, water, mercury, hydrocarbons, or combinations thereof. The fluid may further comprise soot, dust, minerals, microbes, solid hydrocarbons, precipitated salts, or combinations thereof.

A screen may be provided, the fluid passing through the screen to the fluid outlet and the one or more solid secondary components crossing the screen and being removed through the solids outlet. The screen may be vibrated to cause the one or more solid secondary components to move out the solids outlet.

The cooling element may comprise vapor-compression refrigeration systems, Peltier coolers, or indirect-contact heat exchangers.

The one or more thermally-conductive surfaces may comprise metals, diamond, graphite, graphene, thermally-conductive ceramics, thermally-conductive resins, thermally-conductive adhesives, or combinations thereof.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Figure 1A:
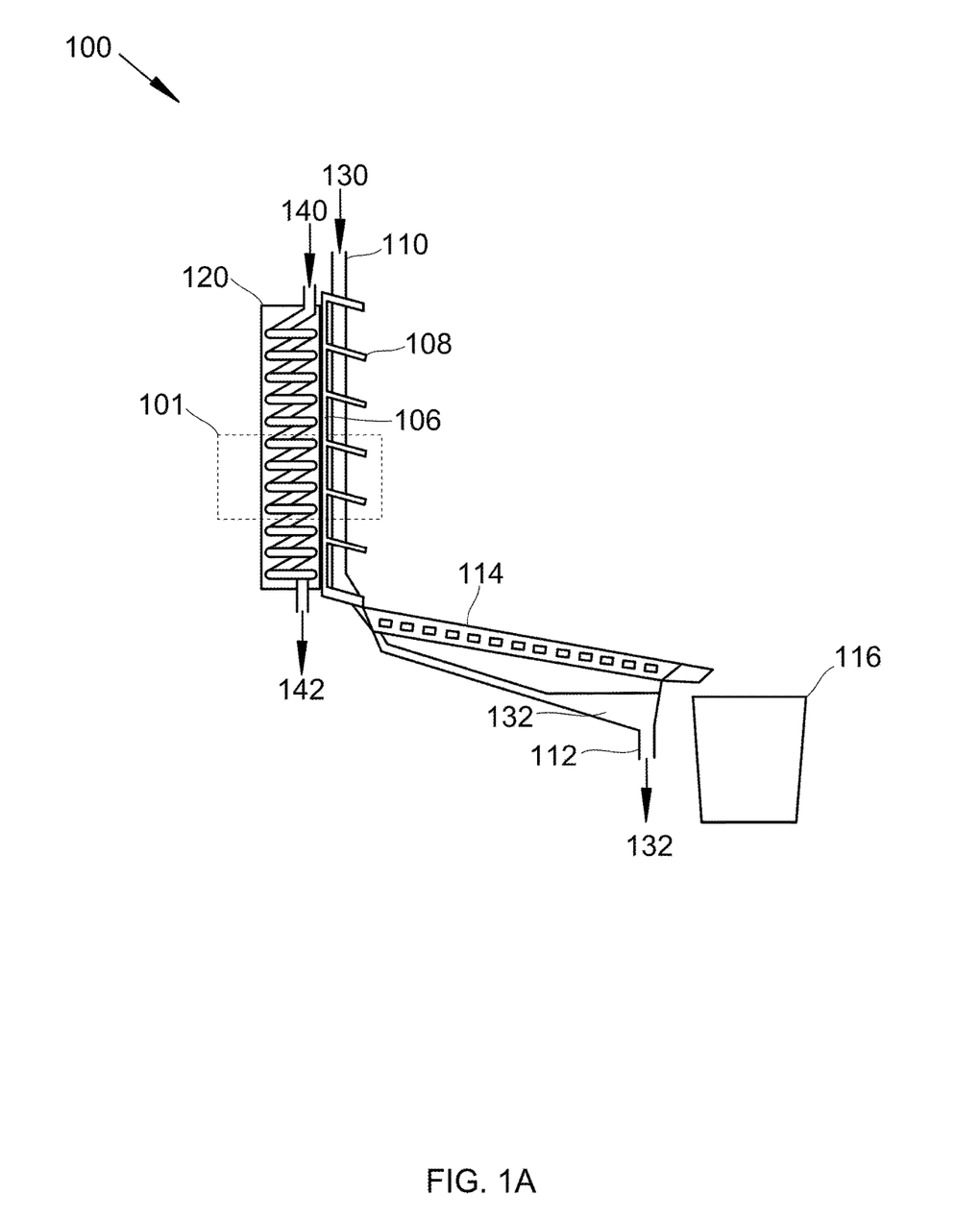
FIG. 1A shows a cross-sectional side view of a device for use in separating components from a fluid.
Figure 1B:
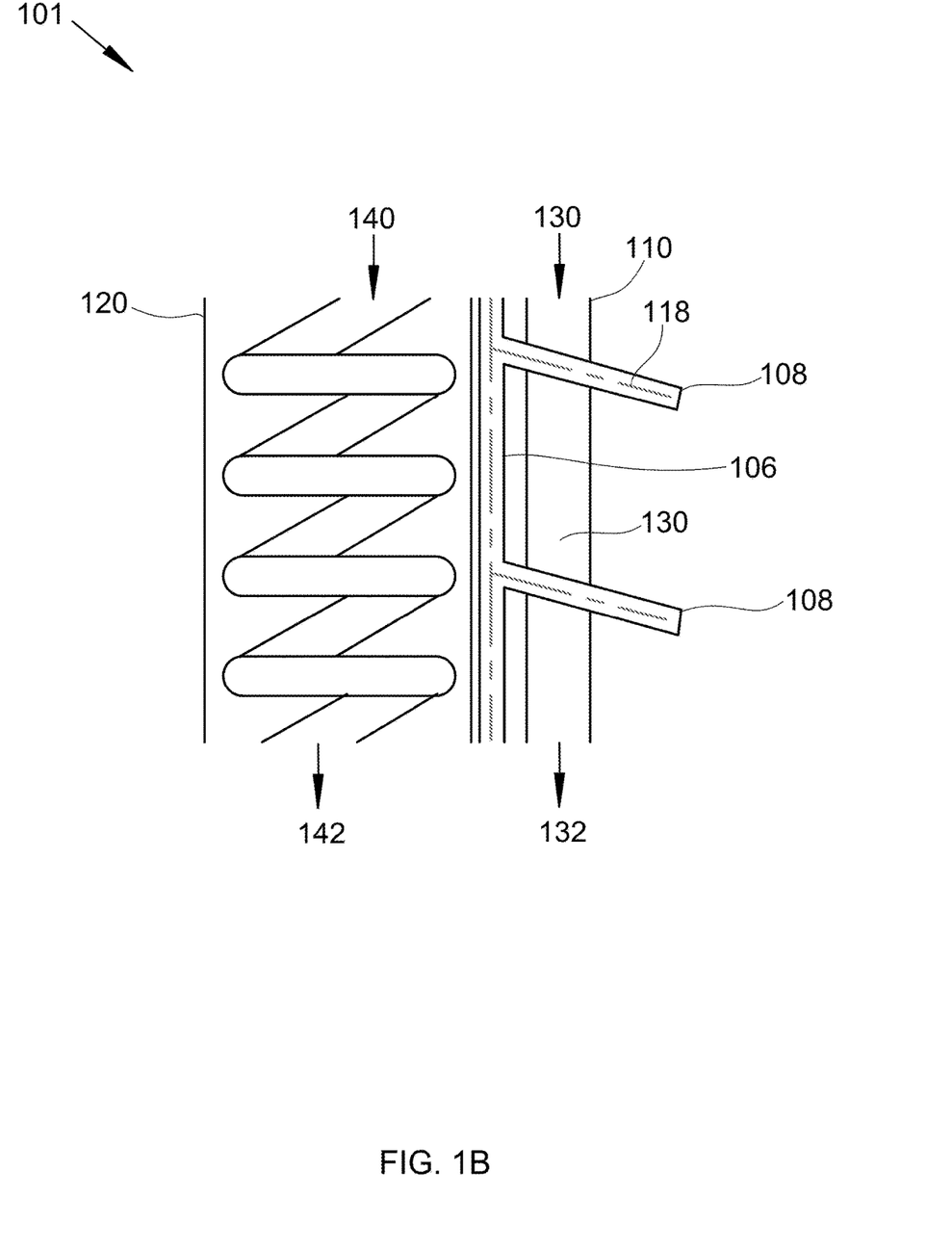
FIG. 1B shows a portion of the device of FIG. 1A.
Figure 1C:
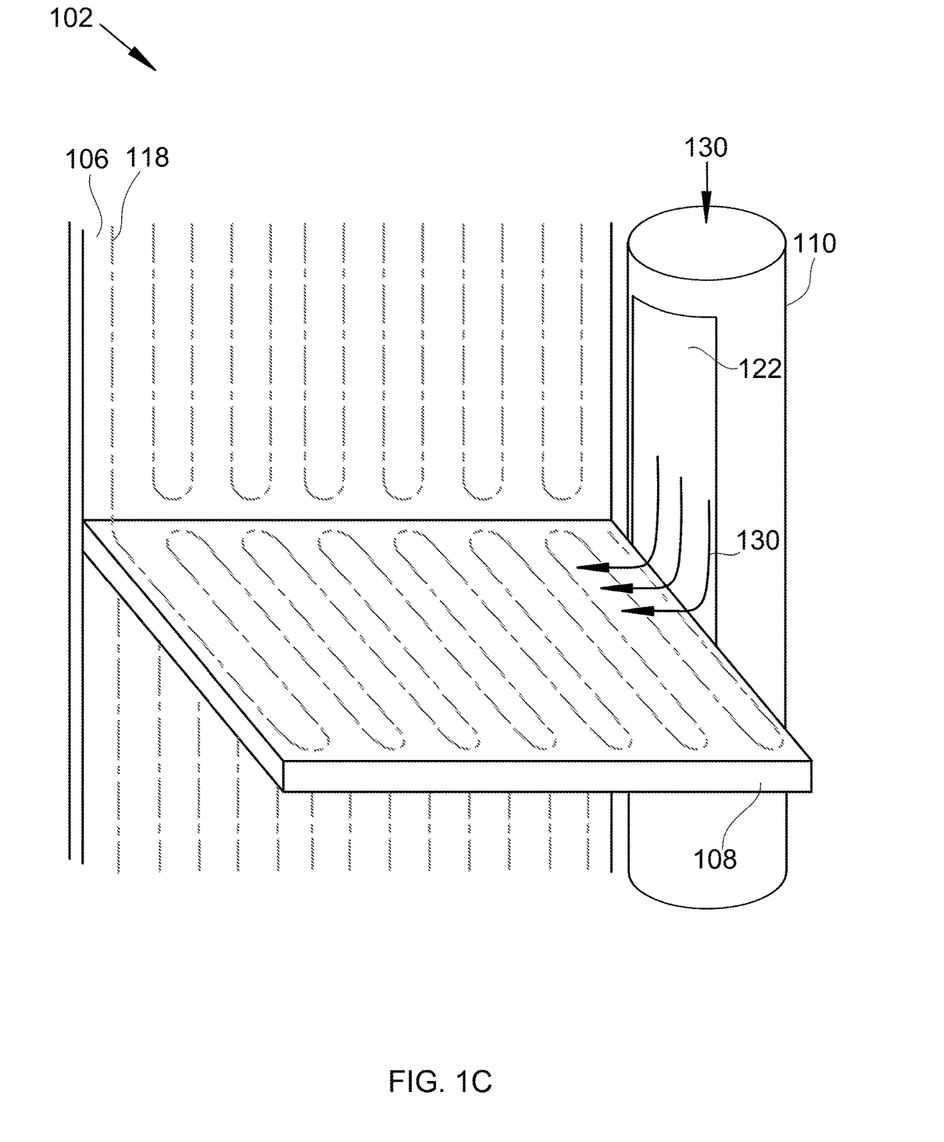
FIG. 1C shows a front, left isometric view of a portion of the device of FIG. 1A.
Figure 1D:
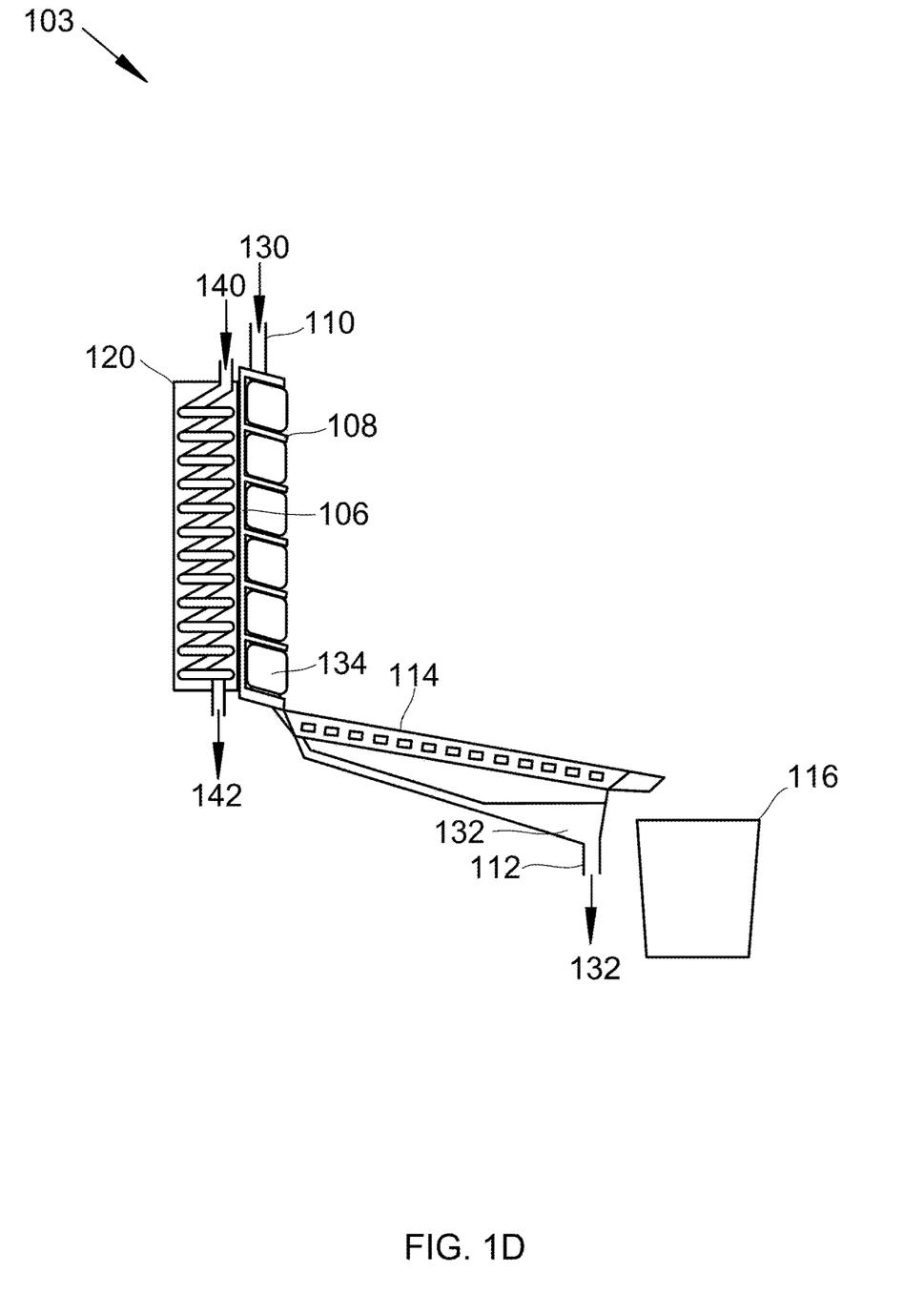
FIG. 1D shows the device of FIG. 1A with solids built-up on shelves.
Figure 1E:
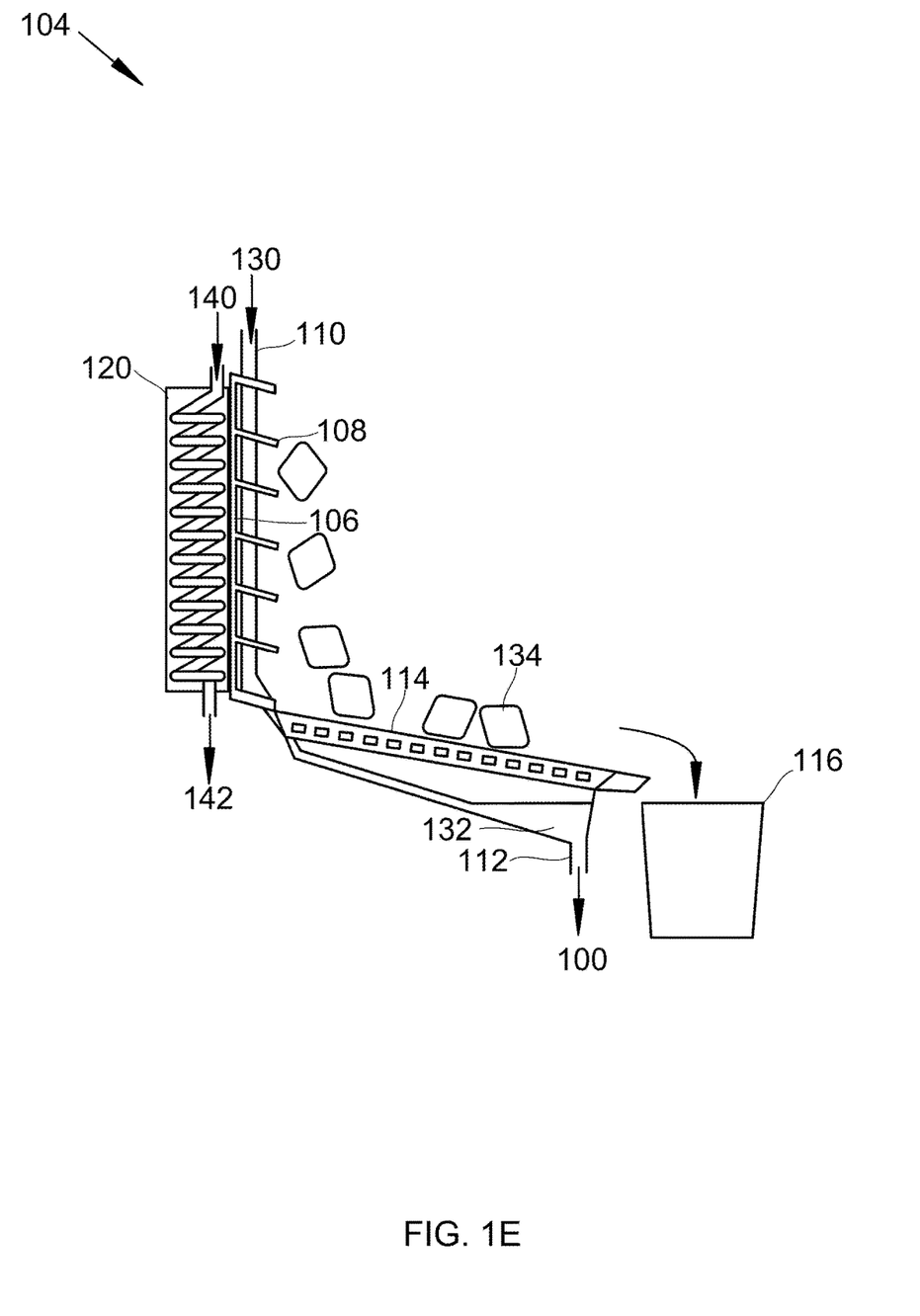
FIG. 1E shows the device of FIG. 1A with solids falling from the shelves.

Referring to FIGS. 1A-E, various views of a device for use in separating components from a fluid is shown at 100-104, as per one embodiment of the present invention. FIG. 1A shows a cross-sectional side view of the device at 100. FIG. 1B shows a portion of the device of FIG. 1A at 101. FIG. 1C shows a front, left isometric view of a portion of the device of FIG. 1A at 102. FIG. 1D shows the device of FIG. 1A with solids built-up on shelves at 103. FIG. 1E shows the device of FIG. 1A with solids falling from the shelves at 104.

Cooling element 120, resistive heating elements 118, fluid inlet 110, thermally-conductive surfaces, vertical support 106 and shelves 108, screen 114, fluid outlet 112, and solids outlet 116 are provided. Cooling element 120 is disposed in contact with the distal side of vertical support 106. Heating elements 118, comprising wires, are embedded in a proximal side of vertical support 106 and shelves 108. Screen 114 is provided below and extending away from shelves 108.

Fluid 130, comprising one or more secondary components dissolved, entrained, suspended, absorbed, condensed, or combinations thereof, in fluid 130, is provided to fluid inlet 110. Fluid 130 freezes at a lower temperature than the one or more secondary components. Cooling element 120 is cooled by coolant 140, which cools vertical support 106 and shelves 108 by conduction. Cooling element 120 is at a temperature that is below the temperature at which the one or more secondary components freeze, but above the temperature at which fluid 130 freezes. Fluid 130 is passed through openings 122 across shelves 108 and the one or more secondary components condense, crystalize, desublimate, freeze, deposit, or combinations thereof, out of fluid 130 as one or more solid secondary components 134, while fluid 132 passes out through screen 114 and fluid outlet 112. Heating elements 118 engage as solid secondary components 134 reach a pre-determined thickness. In this case, that thickness is shown in 103. Heating of heating elements 118 causes the edges of solid secondary components 134 to melt, causing solid secondary components 134 to detach from shelves 108 and vertical support 106. Solid secondary components 134 fall across screen 114 and out solids outlet 116, as shown at 104. Heating elements 118 disengage, restarting production of solid secondary component 134.

Figure 2A:
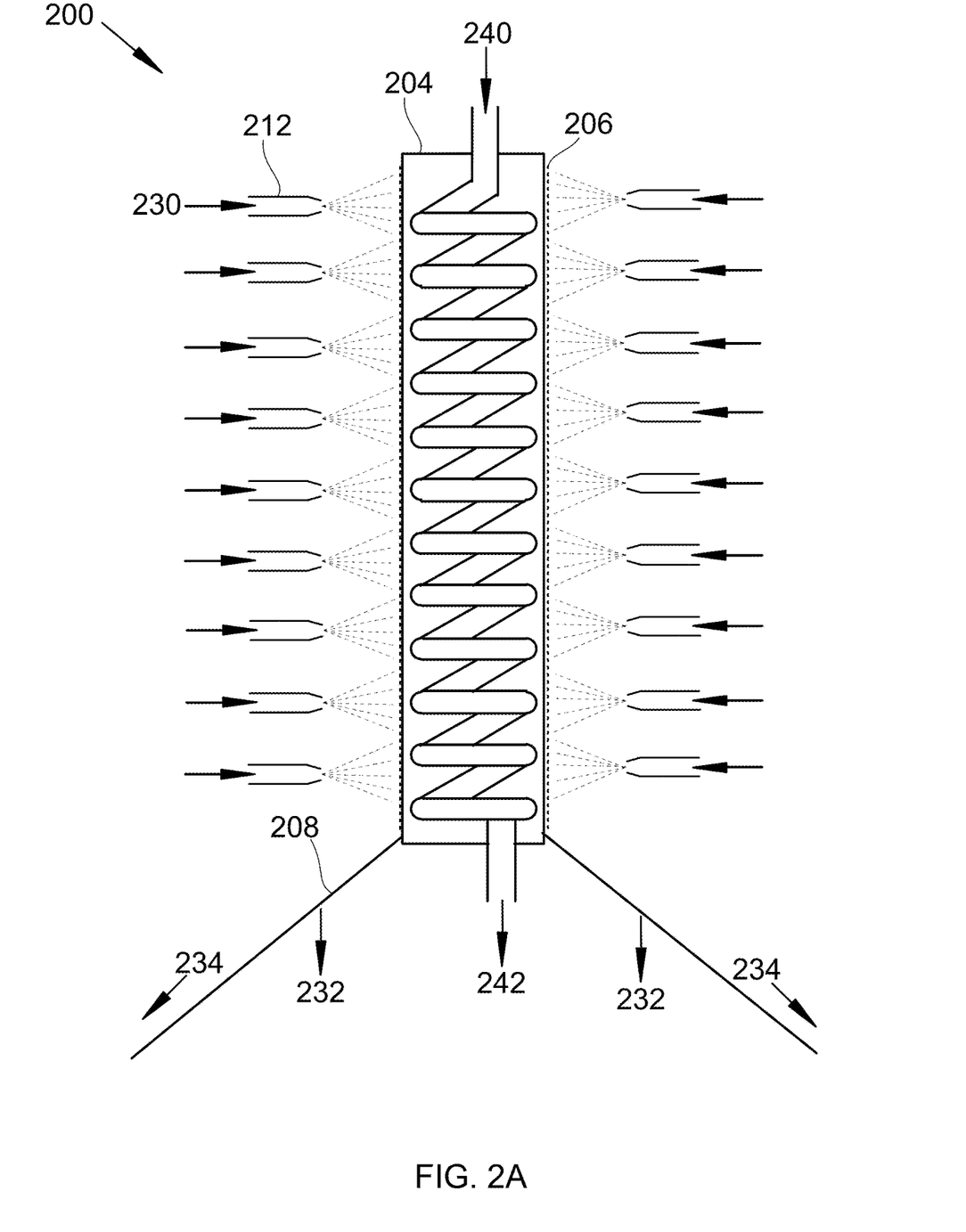
FIG. 2A shows a cross-sectional side view of a device for use in separating components from a fluid.
Figure 2B:
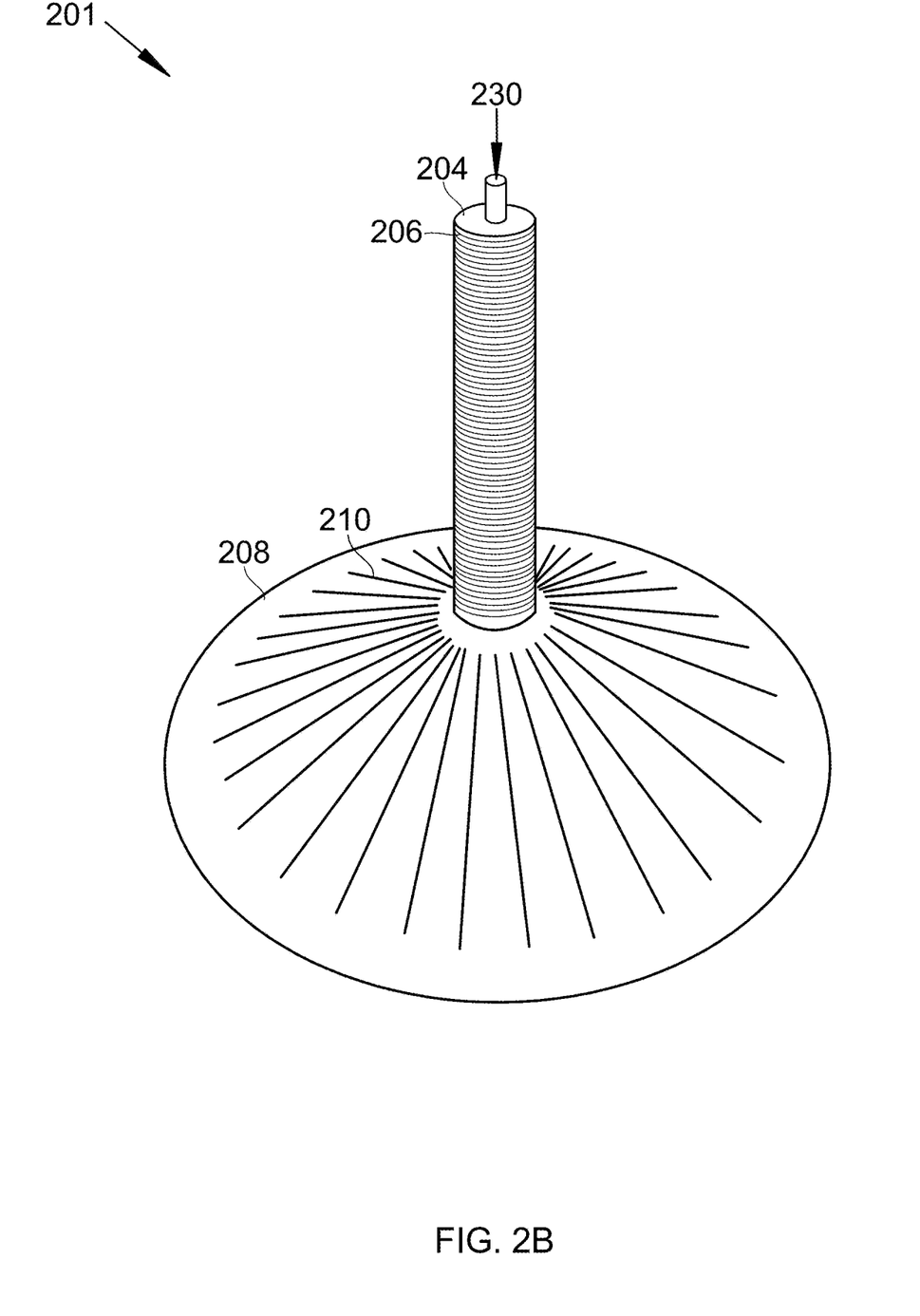
FIG. 2B shows a front, top isometric view of the device of FIG. 2A.

Referring to FIGS. 2A-B, a cross-sectional side view and a front, top isometric view of a device for use in separating components from a fluid is shown at 200 and 201, respectively, as per one embodiment of the present invention.

Cooling element 204, resistive heating elements 206, fluid inlet nozzles 212, screen 208, a fluid outlet, and a solids outlet are provided. Heating elements 206 comprise a wire coil around cooling element 204. Heating elements 206 and the outer surface of cooling element 204 comprise the thermally-conductive surface. Cooling element 204 is cooled by coolant 240, thereby cooling the outer surface and heating element 206. Cooling element 220 is at a temperature that is below the temperature at which the one or more secondary components freeze, but above the temperature at which fluid 230 freezes. Screen 208 comprises slits 210 and is below and extends away from cooling element 204. Slits 210 comprise the fluid outlet. The outer edge of screen 208 comprises the solids outlet.

Fluid 230, comprising a secondary component dissolved in fluid 230, is provided through fluid inlet nozzles 210. Fluid 230 freezes at a lower temperature than the secondary component. Fluid 230 is sprayed on heating elements 206 and the outer surface of cooling element 204 and the secondary component condenses, crystallizes, desublimates, freezes, deposits, or combinations thereof, out of fluid 230 as a solid secondary component, while the fluid passes out through slits 210 as fluid 232. Heating elements 206 engage as the solid secondary component reaches a pre-determined thickness. Heating of heating elements 206 causes the edges of the solid secondary component to melt, causing the solid secondary component to detach and fall across screen 208 and out the solids outlet 216 as solids 234. Heating elements 206 disengage, restarting production of the solid secondary component.

Figure 3A:
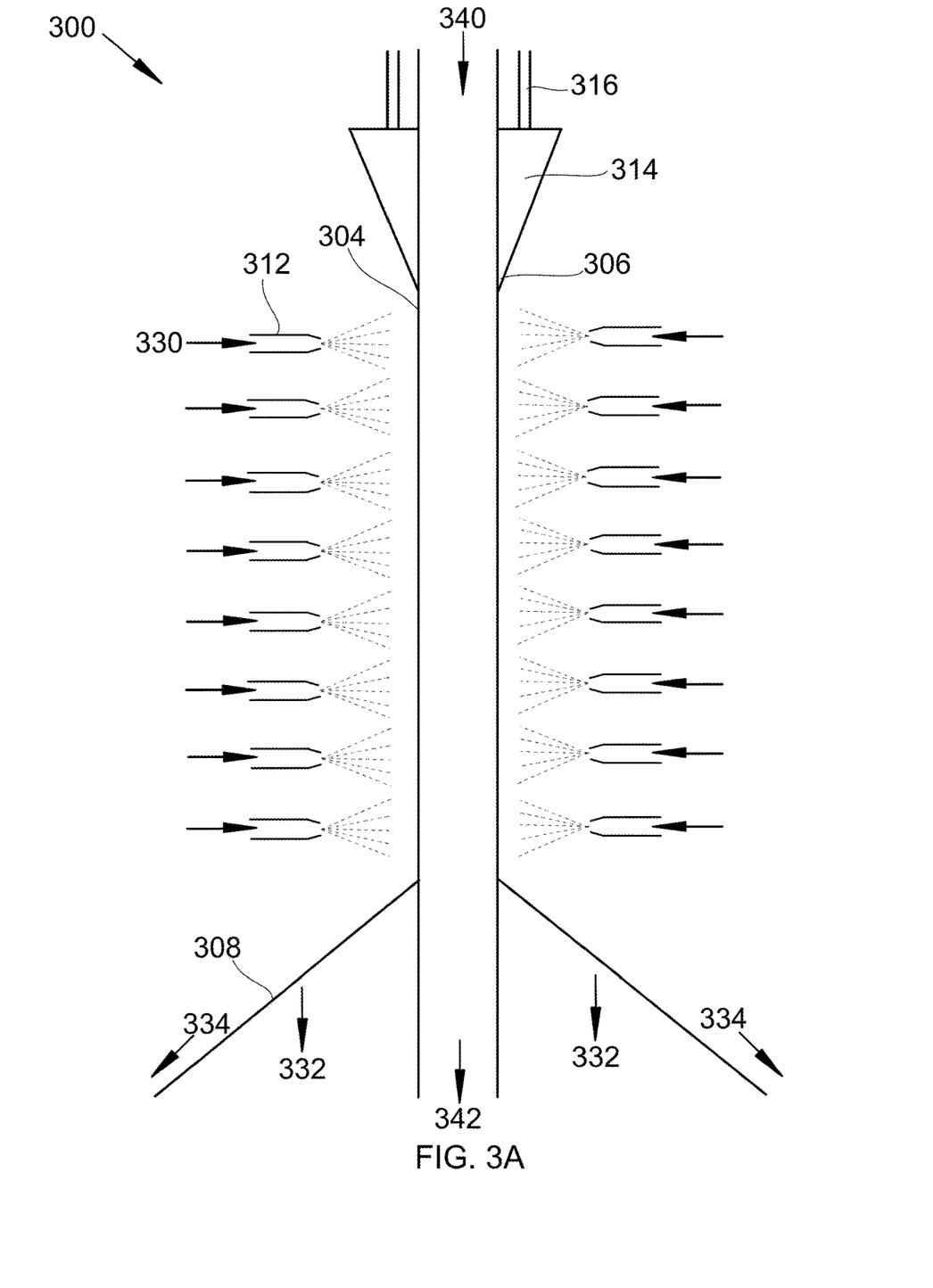
FIG. 3A shows a cross-sectional side view of a device for use in separating components from a fluid.
Figure 3B:
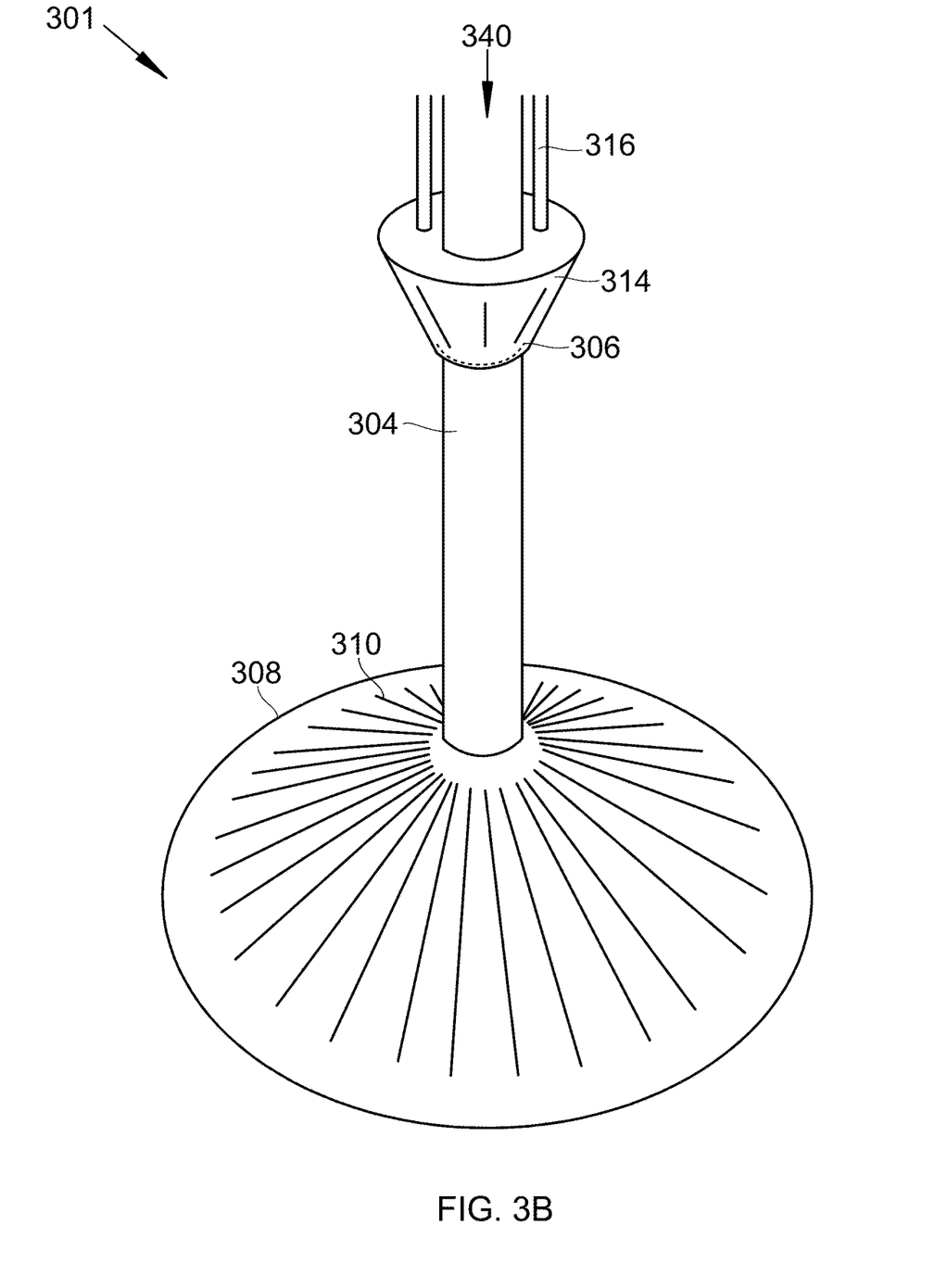
FIG. 3B shows a front, top isometric view of the device of FIG. 3A.

Referring to FIGS. 3A-B, a cross-sectional side view and a front, top isometric view of a device for use in separating components from a fluid is shown at 300 and 301, respectively, as per one embodiment of the present invention.

Cooling element 304, piston-driven slicer 314, resistive heating element 306, fluid inlet nozzles 312, screen 308, a fluid outlet, and a solids outlet are provided. Heating element 306 comprises a wire coil around the tip of piston-driven slicer 314. The outer surface of cooling element 304 comprises the thermally-conductive surface. Cooling element 304 is cooled by coolant 340, thereby cooling the outer surface. Cooling element 320 is at a temperature that is below the temperature at which the one or more secondary components freeze, but above the temperature at which fluid 330 freezes. Screen 308 comprises slits 310 and is below and extends away from cooling element 304. Slits 310 comprise the fluid outlet. The outer edge of screen 308 comprises the solids outlet.

Fluid 330, comprising a secondary component, is provided through fluid inlet nozzles 310. Fluid 330 freezes at a lower temperature than the secondary component. Fluid 330 is sprayed on the outer surface of cooling element 304 and the secondary component condenses, freezes, desublimates, crystalizes, deposits, or combinations thereof, out of fluid 330 as a solid secondary component, while the primary component passes out through slits 310 as fluid 332. Heating element 306 engages and spraying of fluid 330 stops as the solid secondary component reaches a pre-determined thickness. Slicer 314 is driven by piston 316 and the heat of heating element 306 causes the edges of the solid secondary component to melt and allows slicer 314 to cut the solid secondary component from the surface, causing the solid secondary component to detach and fall across screen 308 and out the solids outlet 316 as solids 334. Heating element 306 disengages, piston 316 retracts slicer 314, and spraying of fluid 330 is restarted, thereby restarting production of the solid secondary component.

Figure 4:
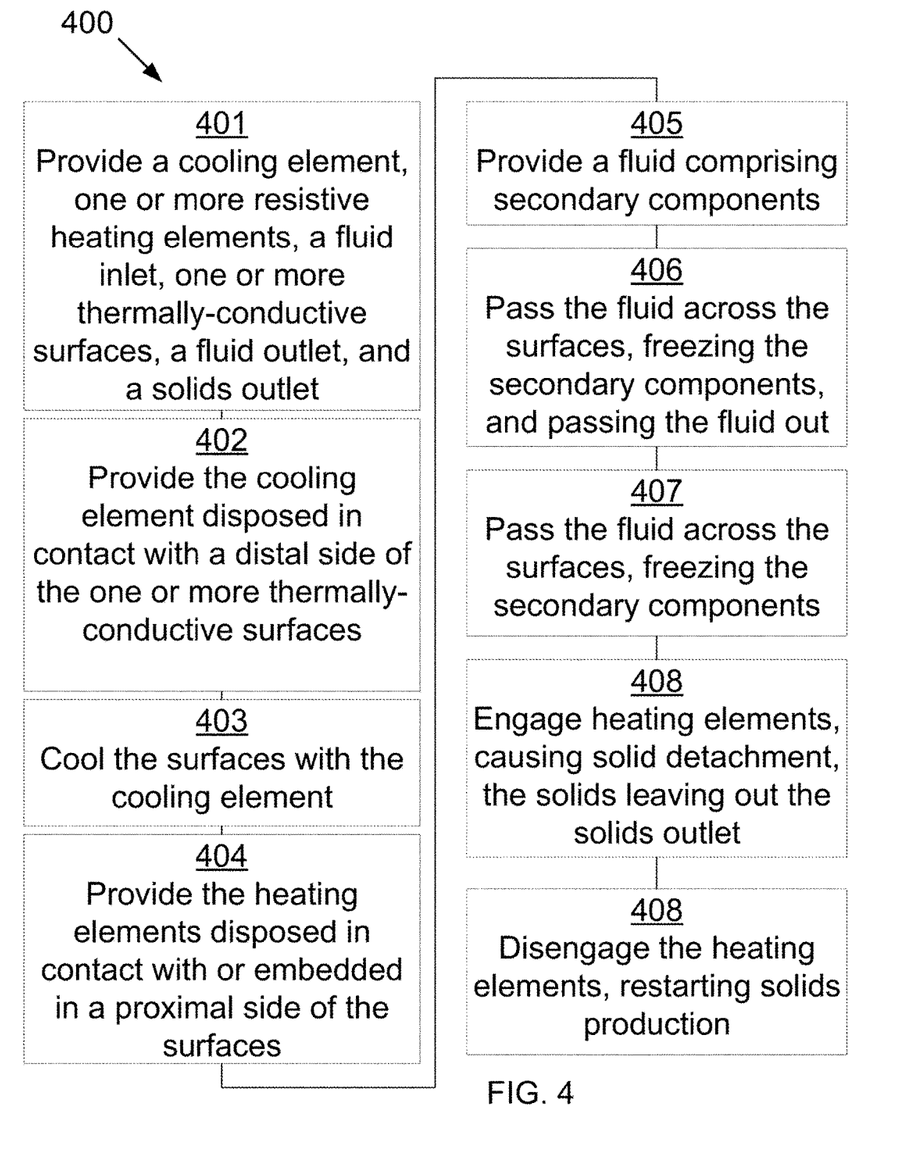
FIG. 4 shows a method for separating components from a fluid.

Referring to FIG. 4, a method for separating components from a fluid is shown at 400, as per one embodiment of the present invention. A cooling element, one or more resistive heating elements, a fluid inlet, one or more thermally-conductive surfaces, a fluid outlet, and a solids outlet are provided 401. The cooling element is provided disposed in contact with a distal side of the one or more thermally-conductive surfaces 402, the cooling element cooling the one or more thermally-conductive surfaces 403. The cooling element is at a temperature that is below the temperature at which the one or more secondary components freeze, but above the temperature at which the fluid freezes. The one or more resistive heating elements are provided disposed in contact with or embedded in a proximal side of the one or more thermally-conductive surfaces 404. A fluid comprising one or more secondary components dissolved, entrained, suspended, absorbed, condensed, or combinations thereof, is provided 405. The fluid freezes at a lower temperature than the one or more secondary components. The fluid is passed across the one or more thermally conductive surfaces and at least a portion of the one or more secondary components freeze, crystalize, desublimate, deposit, condense, or combinations thereof, out of the fluid as one or more solid secondary components, while the fluid passes out the fluid outlet 406. The one or more resistive heating elements engage such that the one or more solid secondary components detach from the one or more thermally-conductive surfaces and pass out the solids outlet 407. The one or more resistive heating elements disengage, restarting production of the one or more solid secondary components 409.

Figure 5:
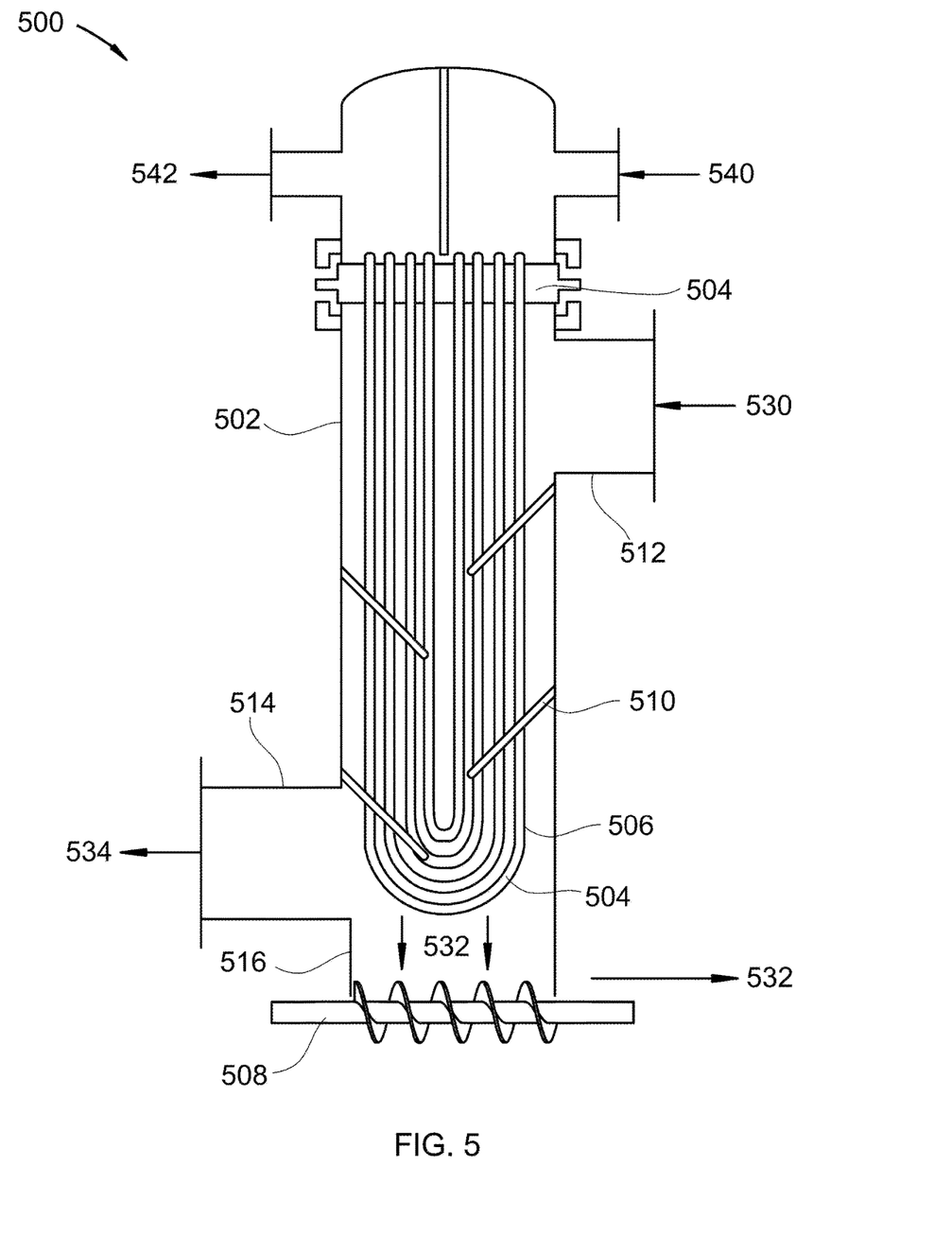
FIG. 5 shows a cross-sectional of a heat exchanger for use in separating components from a fluid.

Referring to FIG. 5, a cutaway view of a heat exchanger for use in separating carbon dioxide from a flue gas is shown at 500, as per one embodiment of the present invention. Exchanger 502 comprises cooling tube bundle 504, wire mesh heating element 506 on the surface of tube bundle 504, gas inlet nozzles 512, auger 508, fluid outlet 514, and solids outlet 516 are provided. The outer surface of cooling tube bundle 504 comprises the thermally-conductive surface. Cooling element 504 is cooled by coolant 540, thereby cooling the outer surface. Cooling element 520 is at a temperature that is below the temperature at which carbon dioxide freezes, but above the temperature at which flue gas 530 freezes. Baffles 510 provide a tortuous path for gases to follow through exchanger 502. Solids outlet 516 is directly above auger 508.

Flue gas 530, comprising carbon dioxide, is provided through fluid inlet 512. Flue gas 530 freezes at a lower temperature than carbon dioxide. Flue gas 530 passes across the outer surface of cooling tube bundle 504 and the carbon dioxide desublimates, condenses, freezes, deposits, or combinations thereof, out of flue gas 530 as solid carbon dioxide 532, while stripped flue gas 534 passes out of fluid outlet 514. Heating element 506 engages and spraying of fluid 530 stops as the solid secondary component reaches a pre-determined thickness. Heating element 506 engages at a set time interval. Heating of heating element 506 causes the edges of solid carbon dioxide 532 to melt, causing solid carbon dioxide 532 to detach and fall through solids outlet 516 and pass through auger 508, resulting in solid product 534. Heating element 506 disengages, thereby restarting production of solid carbon dioxide 532. In some embodiments, flow of flue gas 530 stops during heating.

In some embodiments, the fluid comprises a gas, a liquid, a slurry, or combinations thereof.

In some embodiments, the fluid flow rate, the engaging and disengaging of the heating elements, and the flow rate of coolant through the cooling element are controlled by one or more processors. In one example, the flow rates are determined by flow sensors, and the cooling element surface temperature is determined by temperature sensors. Examples of processors include, application specific processors, applications specific integrated circuits (ASICs), field programmable gate arrays (FPGAs), and similar. In some embodiments, the method further comprises detecting that the one or more solid secondary components reach a pre-determined thickness before engaging the one or more resistive heating elements. In some embodiments, an instrument is provided that measures thicknesses of the one or more solid secondary components on the one or more thermally-conductive surfaces. In some embodiments, the instrument comprises one or more pistons that probe the one or more thermally-conductive surfaces, determining the thicknesses by how close the one or more pistons come to the one or more thermally-conductive surfaces without resistance. In some embodiments, the instrument provides a signal to a controller. In some embodiments, engaging the one or more resistive heating elements occurs at a set interval.

In some embodiments, the one or more thermally conductive surfaces comprise slanted shelves attached to a vertical support. In some embodiments, one or more of the resistive heating elements are provided adjacent to the vertical support and a top portion of the one or more shelves.

In some embodiments, the one or more thermally conductive surfaces comprise a cylindrical surface of a cylindrical cooling heat exchanger. In some embodiments, the cylindrical surface is overlaid with the one or more resistive heating elements, the one or more resistive heating elements comprising a fine, wire mesh heated by electricity.

In some embodiments, the one or more resistive heating elements comprise a ring of a conductive material, the ring embedded in an end of a piston which descends when the heating element is engaged, warming the solid secondary component and slicing the solid secondary component off the cylindrical surface, and returns to a top portion when the heating element is disengaged.

In some embodiments, the one or more resistive heating elements comprise wires embedded in the thermally-conductive surfaces.

In some embodiments, the fluid comprises water, hydrocarbons, fluid ammonia, fluid carbon dioxide, cryogenic fluids, or combinations thereof. In some embodiments, the hydrocarbons comprise 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methyl cyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

In some embodiments, the one or more secondary components further comprise soot, dust, minerals, microbes, solid hydrocarbons, precipitated salts, or combinations thereof. In some embodiments, the secondary component comprises carbon dioxide, nitrogen oxide, sulfur dioxide, nitrogen dioxide, sulfur trioxide, hydrogen sulfide, hydrogen cyanide, water, mercury, hydrocarbons, or combinations thereof. In some embodiments, the secondary component is dissolved, entrained, or dissolved and entrained in the fluid.

In some embodiments, a screen is provided, the fluid passing through the screen to the fluid outlet and the one or more solid secondary components crossing the screen and being removed through the solids outlet. In some embodiments, the screen is vibrated to cause solid secondary component to move out the solids outlet.

In some embodiments, the cooling element comprises vapor-compression refrigeration systems, Peltier coolers, or indirect-contact heat exchangers.

In some embodiments, the one or more thermally-conductive surfaces comprise metals, diamond, graphite, graphene, thermally-conductive ceramics, thermally-conductive resins, thermally-conductive adhesives, or combinations thereof.

In some embodiments, the fluid with the secondary component removed is cooled, and passed through a carrier gas from which the secondary component is stripped, and returned to the fluid inlet.

Combustion flue gas consists of the exhaust gas from a fireplace, oven, furnace, boiler, steam generator, or other combustor. The combustion fuel sources include coal, hydrocarbons, and biomass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases. Dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases include gases produced by refining precious metals, such as gold and silver. These off-gases tend to contain significant amounts of mercury and other metals.

We claim:

1. A method for separating components from a fluid comprising:
   providing a cooling element, one or more resistive heating elements, a fluid inlet, one or more thermally-conductive surfaces, a fluid outlet, and a solids outlet;
   providing the cooling element disposed in contact with a distal side of the one or more thermally-conductive surfaces, the cooling element cooling the one or more thermally-conductive surfaces;
   providing the one or more resistive heating elements disposed in contact with or embedded in a proximal side of the one or more thermally-conductive surfaces;
   providing a fluid comprising one or more secondary components dissolved, entrained, suspended, absorbed, condensed, or combinations thereof, wherein the fluid freezes at a lower temperature than the one or more secondary components, wherein the fluid is passed across the one or more thermally conductive surfaces, at least a portion of the one or more secondary components freezing, crystalizing, desublimating, depositing, condensing, or combinations thereof, out of the fluid as one or more solid secondary components, while the fluid passes out the fluid outlet;

detecting that the one or more solid secondary components reach a pre-determined thickness by an instrument that measures thicknesses of the one or more solid secondary components on the one or more thermally-conductive surfaces, wherein the instrument comprises one or more pistons that probe the one or more thermally-conductive surfaces, determining the thicknesses by how close the one or more pistons come to the one or more thermally-conductive surfaces without resistance;

engaging the one or more resistive heating elements such that the one or more solid secondary components detach from the one or more thermally-conductive surfaces and pass out the solids outlet; and, disengaging the one or more resistive heating elements, restarting production of the one or more solid secondary components.

2. The method of claim 1, wherein the fluid comprises a gas, a liquid, a slurry, or combinations thereof.

3. The method of claim 1, further comprising the instrument providing a signal to a controller.

4. The method of claim 1, wherein the one or more thermally conductive surfaces comprise slanted shelves attached to a vertical support.

5. The method of claim 4, further comprising providing one or more of the resistive heating elements adjacent to the vertical support and a top portion of the one or more shelves.

6. The method of claim 1, wherein the one or more secondary components further comprise soot, dust, minerals, microbes, solid hydrocarbons, precipitated salts, or combinations thereof.

7. The method of claim 1, wherein the fluid comprises water, hydrocarbons, liquid ammonia, liquid carbon dioxide, cryogenic liquids, flue gas, syngas, producer gas, natural gas, steam reforming gas, hydrocarbons, light gases, refinery off-gases, organic solvents, steam, ammonia, or combinations thereof.

8. The method of claim 1, wherein the one or more secondary components comprise carbon dioxide, nitrogen oxide, sulfur dioxide, nitrogen dioxide, sulfur trioxide, hydrogen sulfide, hydrogen cyanide, water, mercury, hydrocarbons, or combinations thereof.

9. The method of claim 1, further comprising providing a screen, the fluid passing through the screen to the fluid outlet and the one or more solid secondary components crossing the screen and being removed through the solids outlet.

10. The method of claim 9, further comprising vibrating the screen to cause the one or more solid secondary components to move out the solids outlet.

11. The method of claim 1, wherein the cooling element comprises vapor-compression refrigeration systems, Peltier coolers, or indirect-contact heat exchangers.

12. The method of claim 1, wherein the one or more thermally-conductive surfaces comprise metals, diamond, graphite, graphene, thermally-conductive ceramics, thermally-conductive resins, thermally-conductive adhesives, or combinations thereof.

13. A method for separating components from a fluid comprising:

providing a cooling element, one or more resistive heating elements, a fluid inlet, one or more thermally-conductive surfaces, a fluid outlet, and a solids outlet, wherein the one or more thermally conductive surfaces comprise a cylindrical surface of a cylindrical cooling heat exchanger;

providing the cooling element disposed in contact with a distal side of the one or more thermally-conductive surfaces, the cooling element cooling the one or more thermally-conductive surfaces;

providing the one or more resistive heating elements disposed in contact with or embedded in a proximal side of the one or more thermally-conductive surfaces;

providing a fluid comprising one or more secondary components dissolved, entrained, suspended, absorbed, condensed, or combinations thereof, wherein the fluid freezes at a lower temperature than the one or more secondary components, wherein the fluid is passed across the one or more thermally conductive surfaces, at least a portion of the one or more secondary components freezing, crystalizing, desublimating, depositing, condensing, or combinations thereof, out of the fluid as one or more solid secondary components, while the fluid passes out the fluid outlet;

engaging the one or more resistive heating elements such that the one or more solid secondary components detach from the one or more thermally-conductive surfaces and pass out the solids outlet; and, disengaging the one or more resistive heating elements, restarting production of the one or more solid secondary components;

wherein the one or more resistive heating elements comprise a ring of a conductive material, the ring embedded in an end of a piston which descends when the heating element is engaged, warming the one or more solid secondary components and slicing the one or more solid secondary components off the cylindrical surface, and returns to a top portion when the heating element is disengaged.

14. The method of claim 13, wherein the one or more thermally conductive surfaces comprise slanted shelves attached to a vertical support.

15. The method of claim 14, further comprising providing one or more of the resistive heating elements adjacent to the vertical support and a top portion of the one or more shelves.

16. The method of claim 13, wherein the one or more secondary components further comprise soot, dust, minerals, microbes, solid hydrocarbons, precipitated salts, or combinations thereof.

17. The method of claim 13, wherein the fluid comprises water, hydrocarbons, liquid ammonia, liquid carbon dioxide, cryogenic liquids, flue gas, syngas, producer gas, natural gas, steam reforming gas, hydrocarbons, light gases, refinery off-gases, organic solvents, steam, ammonia, or combinations thereof.

18. The method of claim 13, wherein the one or more secondary components comprise carbon dioxide, nitrogen oxide, sulfur dioxide, nitrogen dioxide, sulfur trioxide, hydrogen sulfide, hydrogen cyanide, water, mercury, hydrocarbons, or combinations thereof.

19. The method of claim 13, further comprising providing a screen, the fluid passing through the screen to the fluid outlet and the one or more solid secondary components crossing the screen and being removed through the solids outlet.

20. The method of claim 19, further comprising vibrating the screen to cause the one or more solid secondary components to move out the solids outlet.

\* \* \* \* \*